US010452883B2

(12) United States Patent
Itoh et al.

(10) Patent No.: US 10,452,883 B2
(45) Date of Patent: Oct. 22, 2019

(54) INFORMATION ACQUISITION SYSTEM, COMMUNICATION TERMINAL, INFORMATION ACQUISITION PROGRAM, SERVER, AND INFORMATION PROVISION PROGRAM (71) Applicant: DENSO CORPORATION, Kariya, Aichi-pref. (JP)

(72) Inventors: Masatoshi Itoh, Kariya (JP); Masatoshi Aboh, Kariya (JP); Yousuke Kimura, Kariya (JP); Hiroki Ukai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 246 days.

(21) Appl. No.: 15/515,568

(22) PCT Filed: Sep. 23, 2015

(86) PCT No.: PCT/JP2015/004827
§ 371 (c)(1),
(2) Date: Mar. 29, 2017

(87) PCT Pub. No.: WO2016/056187
PCT Pub. Date: Apr. 14, 2016

(65) Prior Publication Data
US 2017/0300733 A1 Oct. 19, 2017

(30) Foreign Application Priority Data
Oct. 7, 2014 (JP) .................... 2014-206341

(51) Int. Cl.
*G06K 7/14* (2006.01)
*G06F 16/954* (2019.01)
(Continued)

(52) U.S. Cl.
CPC ........... *G06K 7/1417* (2013.01); *G01C 21/36* (2013.01); *G06F 16/29* (2019.01); *G06F 16/954* (2019.01);
(Continued)

(58) Field of Classification Search
CPC .... G06F 16/9554; G06F 16/29; G06F 16/954; H04L 67/10; G01C 21/36; G06K 19/06037; G06K 7/1417
See application file for complete search history.

(56) References Cited

U.S. PATENT DOCUMENTS

2002/0002504 A1* 1/2002 Engel ................. G06Q 10/0637
705/7.36
2003/0083807 A1* 5/2003 Kuroda ................ G01C 21/362
701/468
(Continued)

FOREIGN PATENT DOCUMENTS

JP       2007101682 A    4/2007
JP       2008181504 A    8/2008
(Continued)

*Primary Examiner* — Daniel I Walsh
(74) *Attorney, Agent, or Firm* — Harness, Dickey & Pierce, P.L.C.

(57) ABSTRACT

An information acquisition system includes a communication terminal that reads an information code storing the point information and a service ID; and a server that stores point information and a service ID in association with each other, the communication terminal accessing the server and acquiring the point information from the server. The communication terminal extracts the point information and the service ID from the information code to transmit to the server the point information and the service ID. At a time of reception of the point information and the service ID, the server extracts, from the point information stored in the server, association point information corresponding to the point information that correlates with the service ID received from
(Continued)

the communication terminal, and transmits the association point information to the communication terminal. The communication terminal outputs the point information, and the association point information received from the server.

7 Claims, 4 Drawing Sheets

(51) Int. Cl.
    *G06F 16/29*     (2019.01)
    *G01C 21/36*     (2006.01)
    *G06K 19/06*     (2006.01)
    *G06F 16/955*     (2019.01)
    *H04L 29/08*     (2006.01)

(52) U.S. Cl.
    CPC ... *G06F 16/9554* (2019.01); *G06K 19/06037* (2013.01); *H04L 67/10* (2013.01)

(56) References Cited

U.S. PATENT DOCUMENTS

| | | | |
|---|---|---|---|
| 2003/0200152 A1* | 10/2003 | Divekar | G06Q 30/06 705/26.64 |
| 2006/0144920 A1* | 7/2006 | Fang | G06F 17/30876 235/375 |
| 2006/0248554 A1* | 11/2006 | Priddy | G06K 9/00885 725/25 |
| 2009/0112815 A1* | 4/2009 | Antognini | G06F 16/954 |
| 2009/0303036 A1 | 12/2009 | Sahuguet | |
| 2009/0319185 A1* | 12/2009 | Chiang | G01C 21/3623 701/469 |
| 2010/0125497 A1* | 5/2010 | Arguello | G06F 17/30879 705/14.33 |
| 2011/0085696 A1* | 4/2011 | Yamakawa | G06F 17/30056 382/100 |
| 2011/0276385 A1* | 11/2011 | Keller | G06Q 20/202 705/14.38 |
| 2012/0136698 A1* | 5/2012 | Kent | G06Q 20/3276 705/14.1 |
| 2012/0142322 A1* | 6/2012 | Gomez | G01C 21/362 455/414.3 |
| 2012/0209730 A1* | 8/2012 | Garrett | G06Q 50/12 705/15 |
| 2012/0220277 A1* | 8/2012 | Gonynor | G06Q 30/02 455/414.2 |
| 2012/0245995 A1* | 9/2012 | Chawla | G06Q 30/02 705/14.45 |
| 2012/0276997 A1* | 11/2012 | Chowdhary | A63F 13/213 463/31 |
| 2013/0018701 A1* | 1/2013 | Dusig | G06Q 30/02 705/7.32 |
| 2013/0027227 A1* | 1/2013 | Nordstrom | G08G 1/202 340/990 |
| 2013/0032081 A1* | 2/2013 | Covington | G06Q 30/0241 116/2 |
| 2013/0046624 A1* | 2/2013 | Calman | G06Q 30/0259 705/14.53 |
| 2013/0131971 A1* | 5/2013 | Parrish | G06F 3/01 701/408 |
| 2013/0193201 A1* | 8/2013 | Bradley | G06F 17/30002 235/375 |
| 2013/0290106 A1* | 10/2013 | Bradley | G06Q 90/20 705/14.64 |
| 2014/0067958 A1* | 3/2014 | Bradley | G06Q 30/0241 709/204 |
| 2014/0162697 A1* | 6/2014 | Cudalbu | G01C 21/20 455/456.3 |
| 2014/0279490 A1* | 9/2014 | Calman | G06Q 20/40 705/43 |
| 2014/0372469 A1* | 12/2014 | Antognini | G06F 16/9032 707/769 |
| 2015/0095327 A1 | 4/2015 | Sakuragawa et al. | |
| 2015/0356659 A1* | 12/2015 | Ghosh | G06Q 30/0631 705/26.7 |
| 2016/0018234 A1* | 1/2016 | Mouser | G01S 19/13 701/491 |
| 2016/0328121 A1* | 11/2016 | Moran | G06F 3/04842 |
| 2018/0165293 A1* | 6/2018 | Wei | G06F 16/9537 |

FOREIGN PATENT DOCUMENTS

| | | |
|---|---|---|
| JP | 2011528454 A | 11/2011 |
| JP | 2013140171 A | 7/2013 |
| WO | WO-2013168384 A1 | 11/2013 |

* cited by examiner

{ POINT INFO (POI NAME, LATITUDE/LONGITUDE)
  SERVICE ID

QR CODE

FIG. 3

| POI NAME | LATITUDE/LONGITUDE | SERVICE ID | CATEGORY |
|---|---|---|---|
| AA | 35.70000, 139.40000 | 000001 | JAPANESE FOOD |
| BB | 35.68000, 139.76715 | 000002 | ITALIAN |
| CC | 35.29001, 139.57832 | 000001 | JAPANESE FOOD |
| DD | 35.30562, 139.13037 | 000003 | FRENCH |
| EE | 35.13707, 139.60571 | 000004 | CHINESE |
| FF | 35.53625, 139.30871 | 000002 | ITALIAN |
| ⋮ | ⋮ | ⋮ | ⋮ |

FIG. 4

FIG. 5

INFORMATION ACQUISITION SYSTEM, COMMUNICATION TERMINAL, INFORMATION ACQUISITION PROGRAM, SERVER, AND INFORMATION PROVISION PROGRAM

CROSS-REFERENCE TO RELATED APPLICATIONAPPLICATIONS

This application is a U.S. National Phase Application under 35 U.S.C. 371 of International Application No. PCT/JP2015/004827 filed on Sep. 23, 2015 and published in Japanese as WO 2016/056187 A1 on Apr. 14, 2016. The present application is based on and claims the benefit of priority from Japanese Patent Application No. 2014-206341 filed on Oct. 7, 2014. The entire disclosures of all of the above applications are incorporated herein by reference.

TECHNICAL FIELD

The present disclosure relates to an information acquisition system, a communication terminal, an information acquisition program, a server, and an information provision program.

BACKGROUND ART

Information codes representing coded information determined beforehand are currently available, such as QR code (registered trademark), QR being quick response. Information codes of this type are highly convenient codes each of which allows a start of a corresponding application program when read by a communication terminal as disclosed in Patent Literature 1, for example. Accordingly, information codes of this type have been used in a variety of fields.

PRIOR ART LITERATURE

Patent Literature

Patent Literature 1: JP 2008-181504 A

SUMMARY OF INVENTION

One of use modes provided by information codes is a mode for storing point information (point of interest (POI)) in information codes. When an information code storing point information is read by a communication terminal, a route targeting the latitude and longitude of the point information, for example, is presented in linkage with a navigation application program. However, even when an information code attached to a sheet of an information magazine or the like stores point information, for example, it is difficult for a user to recognize that the information code stores the point information only by viewing the information code. Accordingly, the user recognizes that the information code stores the point information only after operating a communication terminal and reading the information code. Moreover, it is further assumable that the user recognizing the presence of the stored point information desires to acquire not only the point information, but also point information associated with the stored point information (also referred to as association point information), such as the case of category search.

For dealing with the foregoing assumable situation, there may be a method (first method) which unifies multiple sets of point information associated with each other into a single information code, and reads the unified and stored single code, and a method (second method) which stores multiple sets of point information associated with each other in separate information codes, and sequentially reads the multiple information codes. According to the first method, however, a data volume stored in the information code increases, and thus the information code may become large-sized. In case of the second method, the operation for sequentially reading the multiple information codes may require time and labor.

It is an object of the present disclosure to provide an information acquisition system, a communication terminal, an information acquisition program, a server, and an information provision program, which are capable of appropriately providing association point information as information associated with point information when an information code storing the point information is read by the communication terminal.

An information acquisition system according to one example of the present disclosure includes: a communication terminal that reads an information code storing the point information and a service ID, and a server that stores point information and a service ID in association with each other, the communication terminal accessing the server and acquiring the point information from the server. In the information acquisition system, the communication terminal extracts the point information and the service ID from the information code read to transmit to the server the point information extracted and the service ID extracted. At a time of reception of the point information and the service ID from the communication terminal, the server extracts, from the point information stored in the server, association point information corresponding to the point information that correlates with the service ID received from the communication terminal, and transmits the association point information to the communication terminal. The communication terminal outputs the point information decoded and extracted from the information code, and the association point information received from the server.

When the communication terminal reads an information code storing point information, the communication terminal outputs the point information stored in the read information code. In addition, the communication terminal receives association point information corresponding to point information having the same service ID as that of the point information stored in the information code from the server, and outputs the association point information. Accordingly, the communication terminal which has read an information code storing point information is allowed to appropriately receive association point information associated with the point information stored in the information code.

Further, according to another example of the present disclosure, a communication terminal capable of accessing a server storing point information and a service ID in association with each other is provided. The communication terminal includes: an information code read portion that reads an information code storing the point information and the service ID; a point information extraction portion that extracts the point information from the information code read by the information code read portion; a service ID extraction portion that extracts the service ID from the information code read by the information code read portion; a terminal-side transmission controller that causes to transmit an information request signal containing the point information extracted by the point information extraction portion and the service ID extracted by the service ID extraction portion to the server; a terminal-side reception controller that causes to receive an information response signal containing association point information corresponding to the point information that correlates with the service ID extracted by the service ID extraction portion from the server; and an information output portion that outputs the point information extracted by the point information extraction portion, and the association point information received from the server by the terminal-side reception controller.

Further, according to another example of the present disclosure, an information acquisition program that causes a terminal-side controller of a communication terminal capable of accessing a server that stores point information and a service ID in association with each other to execute: an information code read process that reads an information code; a point information extraction process that extracts point information from the information code read by the information code read process; a service ID extraction process that extracts a service ID from the information code read by the information code read process; a terminal-side transmission control process that causes to transmit an information request signal containing the point information extracted by the point information extraction process and the service ID extracted by the service ID extraction process to the server; a terminal-side reception control process that causes to receive an information response signal containing association point information corresponding to point information that correlates with the service ID extracted by the service ID extraction process from the server; and an information output process that outputs the point information extracted by the point information extraction process, and the association point information received from the server by the terminal-side reception control process is provided.

Further, according to another example of the present disclosure, a server that stores point information and a service ID in association with each other, and is capable of be accessed from a communication terminal is provided. The server includes: a server-side reception controller that causes to receive an information request signal containing the point information and the service ID from the communication terminal; an association point information extraction portion that extracts, from the point information stored in the server, association point information corresponding to the point information that correlates with the service ID received by the server-side reception controller from the communication terminal; and a server-side transmission controller that causes to transmit an information response signal containing the association point information extracted by the association point information extraction portion to the communication terminal.

Further, according to another example of the present disclosure, an information provision program that causes a server-side controller of a server storing point information and a service ID in association with each other, and being capable of be accessed from a communication terminal to execute: a server-side reception control process that causes to receive an information request signal containing point information and a service ID from the communication terminal; an association point information extraction process that extracts, from the point information stored in the server, association point information corresponding to point information that correlates with the service ID received by the terminal-side reception control process from the communication terminal; and a server-side transmission control process that causes to transmit an information response signal containing the association point information extracted by the association point information extraction process to the communication terminal is provided According to the information acquisition system, the communication terminal, the information acquisition program, the server, and the information provision program described above, the communication terminal which has read an information code storing point information is allowed to appropriately receive association point information associated with the point information stored in the information code.

BRIEF DESCRIPTION OF DRAWINGS

The above and other aspects, features and advantages of the present disclosure will become more apparent from the following detailed description made with reference to the accompanying drawings. In the drawings.

DESCRIPTION OF EMBODIMENT

An embodiment according to the present disclosure is hereinafter described with reference to the drawings.

Figure 1:
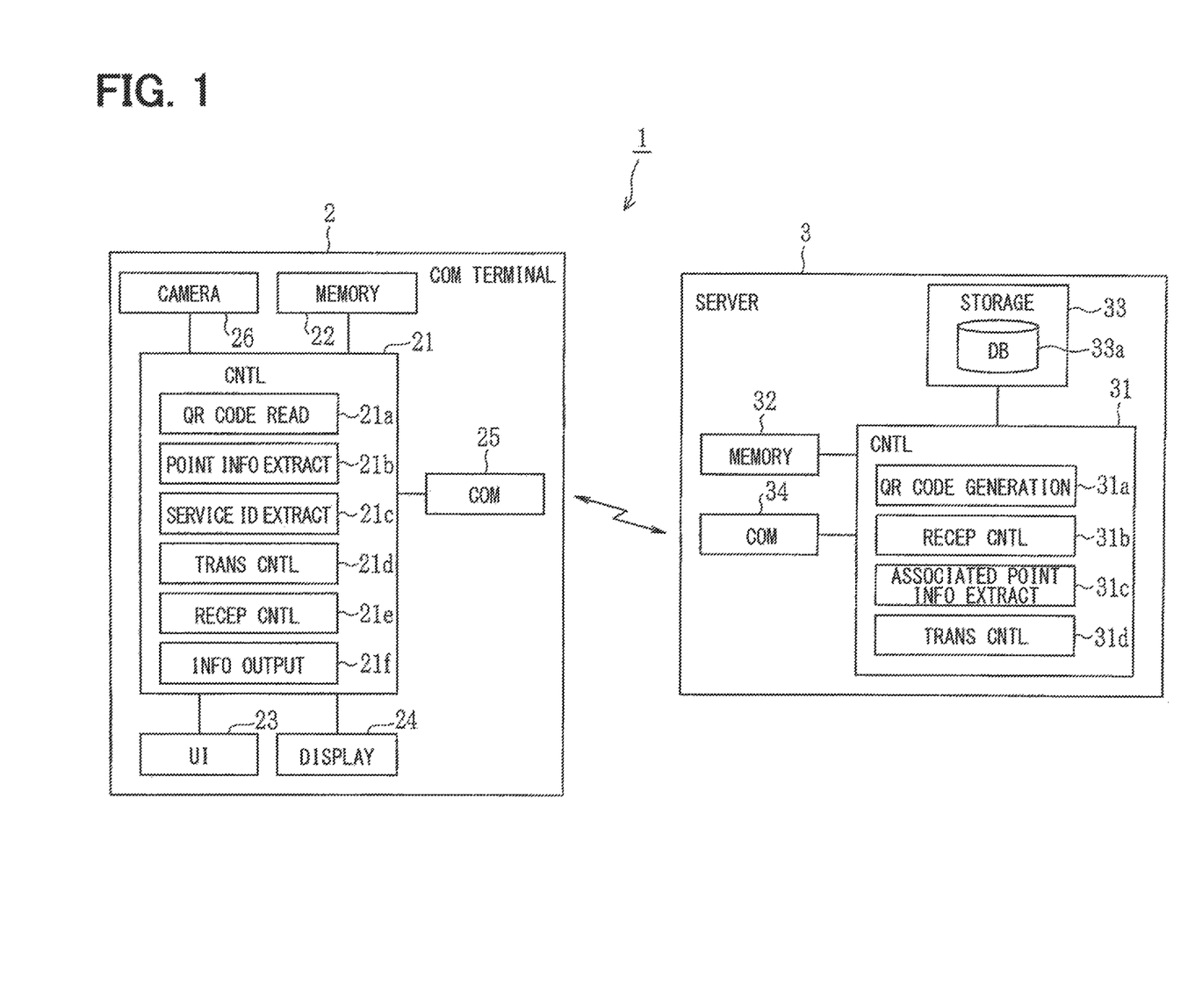
FIG. 1 is a view illustrating an overall configuration of an information acquisition system of one embodiment.

As illustrated in FIG. 1, an information acquisition system 1 includes a communication terminal 2 and a server 3. The communication terminal 2 and the server 3 are configured to perform data communication between each other via a communication network (including the Internet). According to the present embodiment, it is assumed that the communication terminal 2 is configured by a so-called smartphone (multifunction-type cellular phone), and that an information code is configured by QR code (registered trademark), QR being a quick response. It is further assumed that an unspecified number of the communication terminals 2 are allowed to access the server 3.

The communication terminal 2 includes a contoller 21, a memory 22, a user interface (UI) portion 23, a display portion 24, a communication portion 25, and a camera 26. The controller 21 is configured by a microcomputer which includes a central processing unit (CPU), a read only memory (ROM), a random access memory (RAM), and an input/output (I/O). The memory 22 configured by a semiconductor memory element or the like, for example, stores computer programs. The controller 21 executes the computer programs stored in the memory 22 to control the overall operation of the communication terminal 2. The controller 21 corresponds to an example of a terminal-side controller. The memory 22 corresponds to an example of a non-transitory tangible computer readable storage medium.

The user interface portion 23 is configured by a touch panel provided on a screen of the display portion 24, mechanical switches and the like, for example, and outputs an operation detection signal indicating contents of a user operation to the controller 21 at the time of reception of the user operation from a user. The display portion 24 configured by a liquid crustal panel, an organic electro-luminescence (EL) panel or the like, for example, displays (draws) a screen designated by a display command signal when the display command signal is input from the controller 21. The communication portion 25 controls data communication with the server 3 via a communication network. The camera 26 includes a charge coupled device (CCD) image sensor, or a complementary metal oxide semiconductor (CMOS) image sensor. When receiving an imaging command signal from the controller 21, the camera 26 performs an imaging operation, and outputs a captured image to the controller 21. Note that the communication terminal 2 has various known functions relating to telephone communication, such as a function for inputting voices emitted from the user as transmitting voices, a function for outputting voices received from a communication partner via a communication network as receiving voices, and a function for storing telephone directory data, as well as the functions mentioned above.

The server 3 includes a controller 31, a memory 32, a storage 33, and a communication portion 34. The controller 31 is configured by a microcomputer including a CPU, a ROM, a RAM, and an I/O. The memory 32 configured by a semiconductor memory element or the like, for example, stores computer programs. The controller 31 executes the computer programs stored in the memory 32 to control the overall operation of the server 3. The storage 33 configured by a storage medium such as a hard disk stores various types of information (such as point information described below) in a database 33a. The communication portion 34 controls data communication with the communication terminal 2 via a communication network. The controller 31 corresponds to an example of a server-side controller. The memory 32 corresponds to an example of a non-transitory tangible computer readable storage medium.

The controller 31 includes a QR code generation portion 31a, a reception controller 31b, an association point information extraction portion 31c, and a transmission controller 31d. The QR code generation portion 31a, the reception controller 31b, the association point information extraction portion 31c, and the transmission controller 31d are configured by computer programs (including information provision program) executed by the controller 31, and realized by software. The reception controller 31b corresponds to an example of a server-side reception controller. The association point information extraction portion 31c corresponds to an example of an association point information extraction portion. The transmission controller 31d corresponds to an example of a server-side transmission controller. The association point information extraction portion 31c is also referred to as an association point information acquisition portion.

Figure 2:
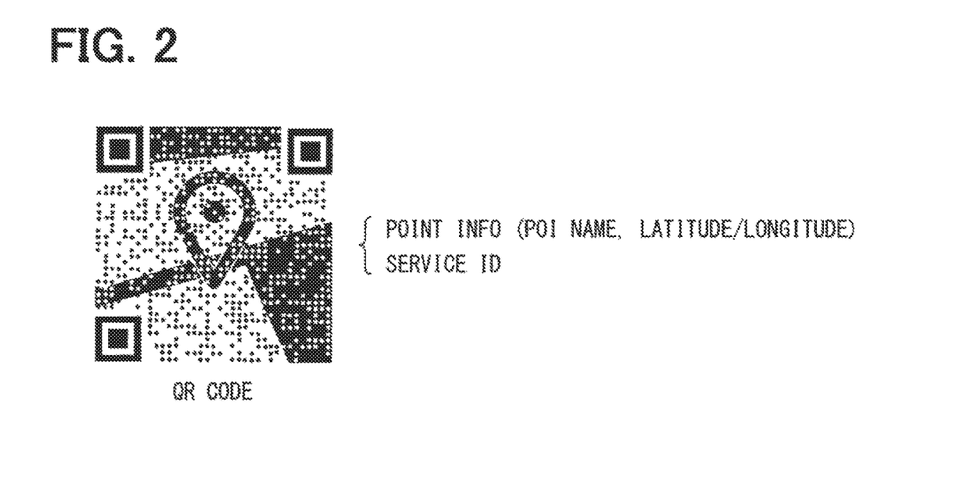
FIG. 2 is a view illustrating a mode of a QR code that stores point information and a service ID.

A QR code generated by the QR code generation portion 31a is hereinafter described. The QR code generation portion 31a generates a QR code (MapQR) which represents coded point information and service ID as illustrated in FIG. 2. The point information is point of interest (POI) information containing a POI name and latitude and longitude of POI. The service ID is an ID indicating a category (service type) of the point information. The QR code thus generated is published on a sheet of an information magazine or on a web page, for example, and read by the communication terminal 2 having an imaging function. Accordingly, an unspecified number of users using the communication terminals 2 each having an imaging function are capable of easily reading the QR code representing the coded point information and service ID by using the imaging function of the communication terminals 2.

Figure 3:
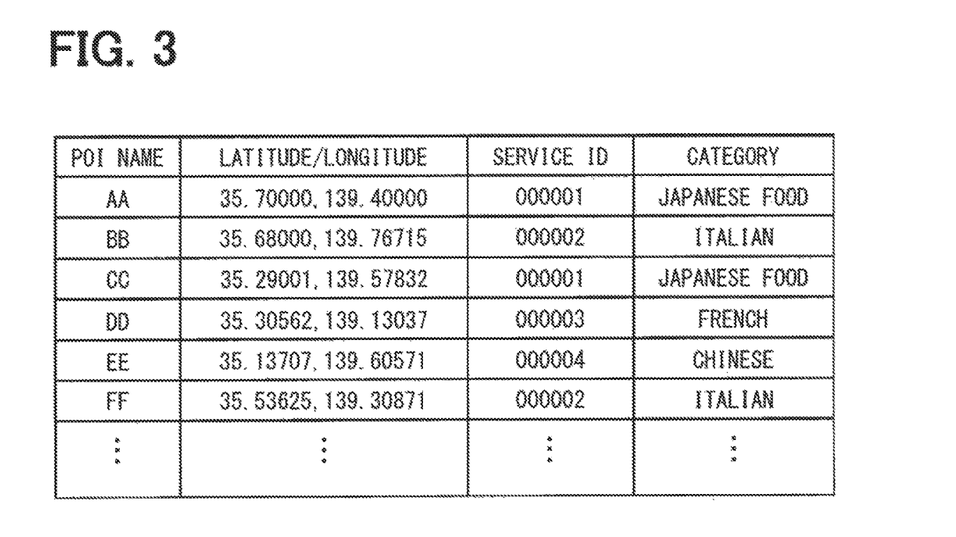
FIG. 3 is a view illustrating information stored in a database of a server.

The database 33a of the storage 33 stores each of point information in association with a corresponding service ID as illustrated in FIG. 3 for QR codes having the foregoing characteristics and generated from the QR code generation portion 31a. A different value of the service ID is given to each of different categories of point information (such as Japanese food and Italian food in FIG. 3), while the same value is given to the same category of point information. The reception controller 31b allows reception of an information request signal containing point information and a service ID from the communication terminal 2. When the reception controller 31b receives the information request signal, the association point information extraction portion 31c specifies the point information and the service ID contained in the received information request signal, and searches the database 33a to extract association point information corresponding to point information which correlates with the service ID as the specified service ID and lies at a distance shorter than a predetermined distance from the specified point information. The transmission controller 31d allows transmission of an information response signal containing the association point information extracted by the association point information extraction portion 31c to the communication terminal 2.

The controller 21 includes a QR code reading portion 21a, a point information extraction portion 21b, a service ID extraction portion 21c, a transmission controller 21d, a reception controller 21e, and an information output portion 21f. The QR code reading portion 21a, the point information extraction portion 21b, the service ID extraction portion 21c, the transmission controller 21d, the reception controller 21e, and the information output portion 21f are configured by the computer programs (including information acquisition program) executed by the controller 21, and realized by software. The QR code reading portion 21a corresponds to an example an information code read portion. The point information extraction portion 21b corresponds to an example of a point information extraction portion. The service ID extraction portion 21c corresponds to an example of a service ID extraction portion. The transmission controller 21d corresponds to an example of a terminal-side transmission controller. The reception controller 21e corresponds to an example of a reception controller (terminal-side reception controller). The information output portion 21f corresponds to an example of an information output portion.

When the camera 26 captures an image showing a QR code, the QR code reading portion 21a receives the captured image from the camera 26 to read the QR code, and decodes the read QR code. When the QR code read by the QR code reading portion 21a contains point information, the point information extraction portion 21b extracts the point information from the QR code. When the QR code read by the QR code reading portion 21a contains a service ID, the service ID extraction portion 21c extracts the service ID from the QR code. The transmission controller 21d allows transmission of an information request signal containing the point information extracted by the point information extraction portion 21b, and the service ID extracted by the service ID extraction portion 21c to the server 3. The reception controller 21e allows reception of an information response signal containing association point information from the server 3. The information output portion 21f generates an image containing the association point information received from the server 3 via the reception controller 21e, and displays the image on the display portion 24.

Figure 4:
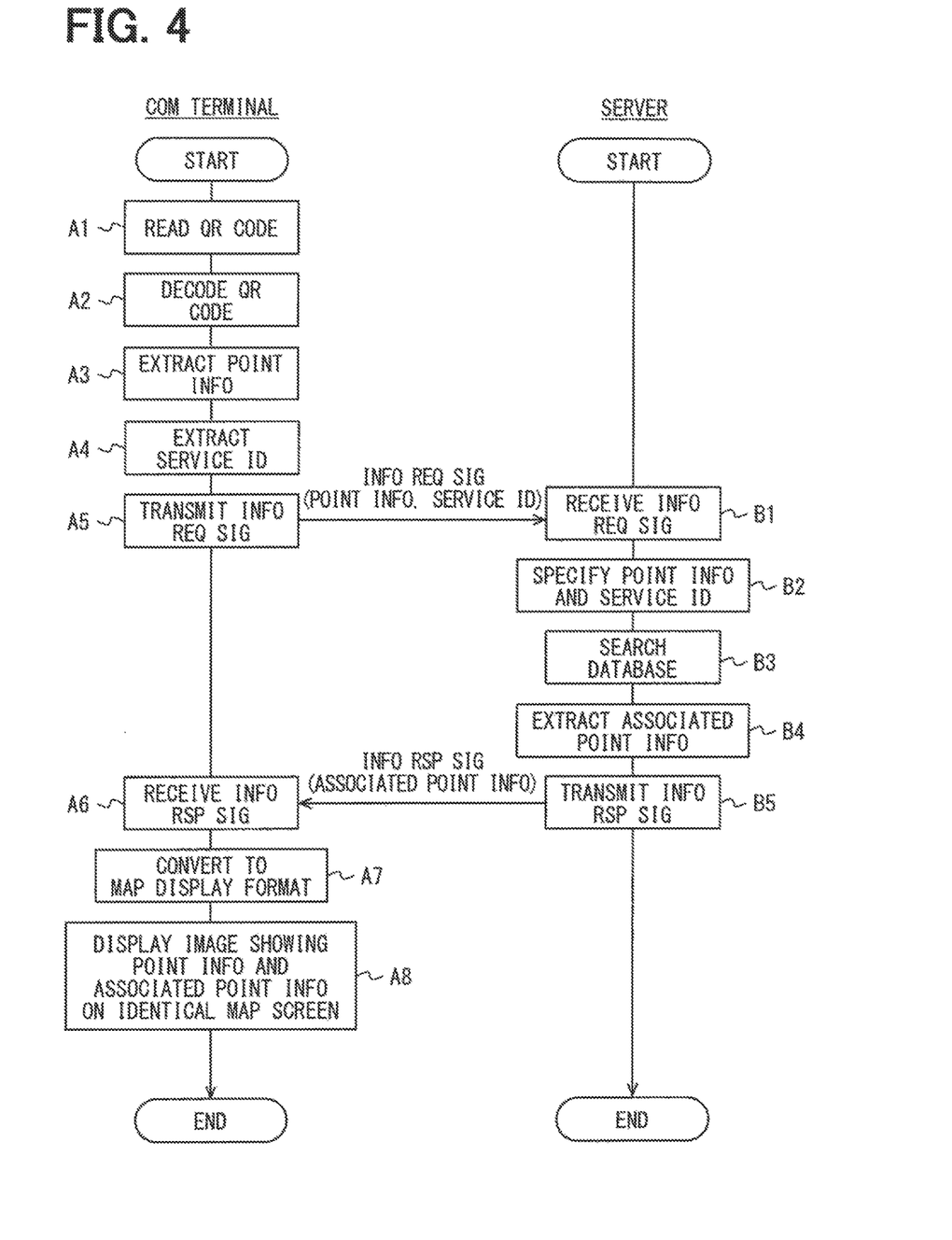
FIG. 4 is a view illustrating processes performed by a communication terminal and the server.

An operation of the configuration described above is hereinafter described with reference to FIGS. 4 and 5.

A user using a QR code operates the communication terminal 2 to capture an image of the QR code by using the camera 26. The controller 21 of the communication terminal 2 having received the image showing the QR code from the camera 26 reads the QR code from the received image via the QR code reading portion 21a (A1: information code read process). The controller 21 having read the QR code decodes the read QR code based on a predetermined algorithm (A2), extracts point information from the read QR code via the point information extraction portion 21b (A3: point information extraction process), and extracts a service ID from the QR code via the service ID extraction portion 21c (A4: service ID extraction process). The controller 21 having extracted the point information and the service ID accesses the server 3 at a uniform resource locator (URL) set beforehand, and allows the transmission controller 21d to transmit an information request signal containing the point information and the service ID to the server 3 via the communication portion 25 (A5: terminal-side transmission control process).

When the controller 31 on the server 3 side receives the information request signal transmitted from the communication terminal 2 via the reception controller 31b (B1: server-side reception control process), the controller 31 specifies the point information and the service ID contained in the received information request signal (B2). The controller 31 having specified the point information and the service ID searches the database 33a (B3) to extract association point information (B4: association point information extraction process). More specifically, the controller 31 extracts association point information corresponding to point information which meets a condition of agreement with the specified service ID, and a condition of a distance shorter than a predetermined distance from the specified point information after calculation of the distance from the specified point information based on the latitude and longitude. Thereafter, the controller 31 allows the transmission controller 31d to transmit an information response signal containing the extracted association point information to the communication terminal 2 via the communication portion 34 (B5: server-side transmission control process). Note that the predetermined distance corresponding to a search range of association point information may be set by the user through operation of the communication terminal 2, or may be uniformly set by the server 3. When the predetermined distance is set by the user through operation of the communication terminal 2, the information request signal transmitted to the server 3 from the communication terminal 2 contains the predetermined distance set by the user as well as the point information and the service ID.

When the controller 21 on the communication terminal 2 side receives the information response signal transmitted from the server 3 via the reception controller 21e (A6: terminal-side reception control process), the controller 21 specifies the association point information contained in the received information response signal, and converts the specified association point information into a format for map display (A7). Thereafter, the controller 21 generates an image showing the point information extracted from the QR code, and the association point information received from the server 3 on the same map screen, and displays the generated image via the information output portion 21f (A8: information output process). In this case, the controller 21 may display the point information and the association point information in a distinguishable manner between the point information and the association point information, such as display in different colors for the point information and the association point information.

Figure 5:
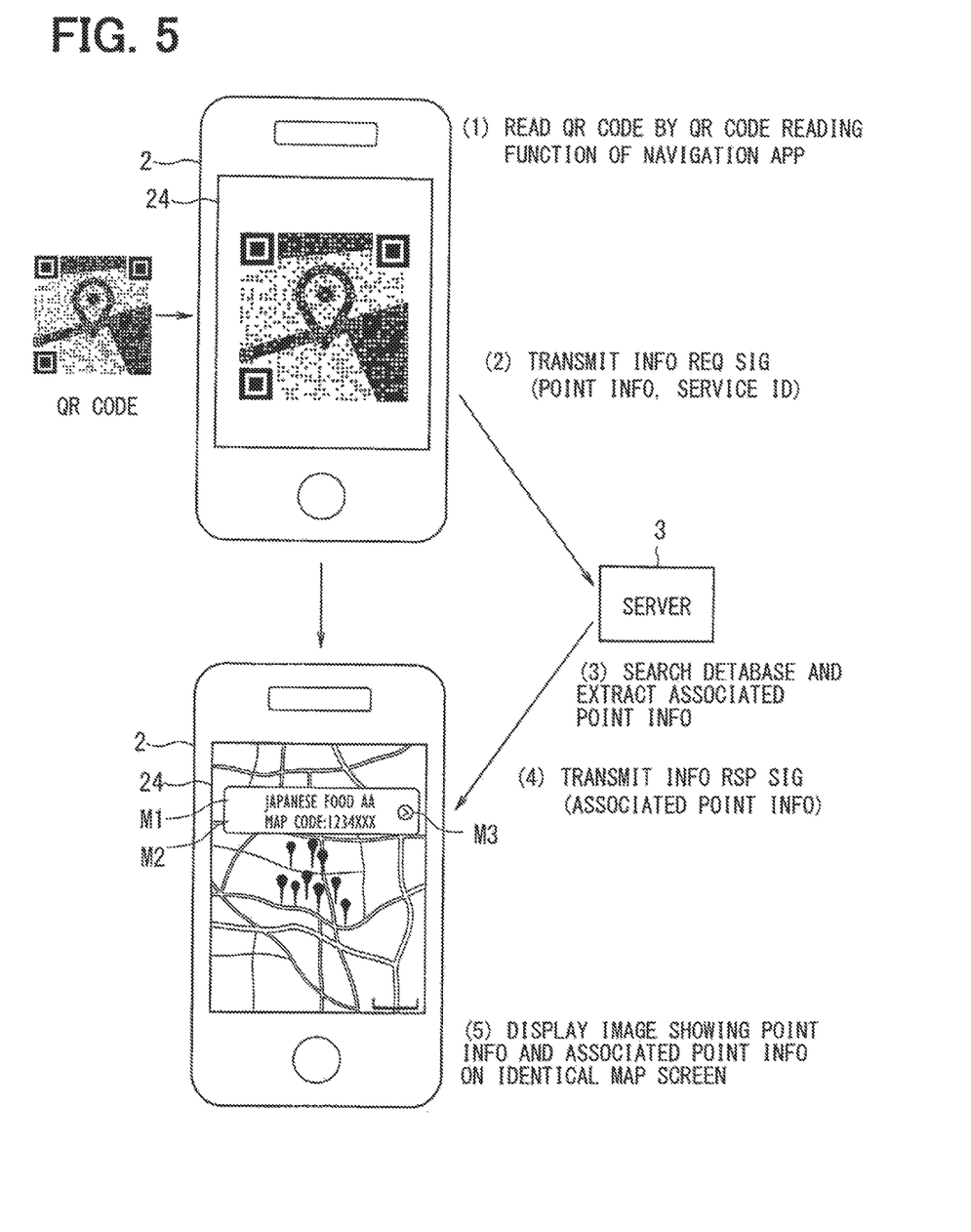
FIG. 5 is a view illustrating a mode of the communication terminal for acquiring association point information from the server.

FIG. 5 illustrates an example of a start of a navigation application program by the communication terminal 2. In this example, a QR code storing point information and a service ID has been read by using a QR code reading function of the navigation application program. The communication terminal 2 having read the QR code by using the QR code reading function of the navigation application program decodes the read QR code, and transmits the decoded point information and service ID to the server 3 (that is, transmits information request signal). The server 3 having received the point information and the service ID from the communication terminal 2 searches the database 33a, extracts association point information meeting the foregoing conditions, and transmits the extracted association point information (that is, transmit information response signal) to the communication terminal 2. The communication terminal 2 having received the association point information from the server 3 displays an image showing the point information extracted from the QR code, and the association point information received from the server 3 on the same map screen.

Accordingly, the user having captured an image of a single QR code by using the camera 26 recognizes not only point information stored in the image of the QR code, but also association point information having the same service ID as that of the point information stored in the QR code (in the same category). In other words, the user is allowed to recognize association point information having the same service ID without the necessity of sequentially imaging multiple QR codes by using the camera 26. Accordingly, a data volume stored in the QR code does not increase. Note that a mode for displaying point information and association point information may be arbitrarily determined, such as distinguishable display in different colors as described above. According to the example illustrated in FIG. 5, the controller 21 displays a POI name M1 of point information, a map code M2, and an arrow button M3 on the map screen. With each press of the arrow button M3 by the user, the controller 21 sequentially displays association point information in the order that the distance from the point information increases, for example, while switching display of the POI name M1 and the map code M2.

As apparent from the above description, the following advantages are offered in the present embodiment.

According to the information acquisition system 1, the server 3 stores point information and service IDs in association with each other. The communication terminal 2 which has read a QR code storing point information and a service ID receives association point information corresponding to point information in accordance with the same service ID from the server 3, and displays both the point information stored in the read QR code, and the association point information received from the server 3 on a map. Accordingly, the communication terminal 2 which has read a QR code storing point information is allowed to appropriately receive association point information associated with the point information stored in the QR code.

The present disclosure is not limited to the example presented in the foregoing embodiment, but may be arbitrarily modified or extended without departing from the scope of the present disclosure.

According to the one embodiment presented by way of example, an information code is exemplified by a QR code. However, the information code may be a two-dimensional code of a type other than a QR code, or a one-dimensional code. In addition, while the communication terminal 2 is configured by a smartphone in the one embodiment presented by way of example, the communication terminal 2 may be a simple cellular phone having a smaller display area of a display portion than a corresponding display area of a smartphone, or a tablet-type terminal having a larger display area of a display portion than a corresponding display area of a smartphone.

According to the one embodiment presented by way of example, the server 3 is configured to generate QR codes, that is, the function of a server generating QR codes and the function of a server accessed by the communication terminal 2 are performed by the same server. However, these functions of the servers may be performed by different servers linked with each other. More specifically, a server generating QR codes may be different from a server storing point information and service IDs in association with each other, that is, arbitrary configurations of servers may be adopted as long as the communication terminal 2 having accessed a server is allowed to extract association point information corresponding to point information which has the same service ID and lies at a distance shorter than a predetermined distance from the specified point information.

According to the one embodiment presented by way of example, point information indicates latitude and longitude of a point. However, point information may contain information based on which a point is directly or indirectly specified, such as an address, a zip code, a telephone number, and a grid square code (JIS X 0410). Accordingly, a "point" includes not only a position, but also a region where the position exists.

According to the one embodiment presented by way of example, a service ID is given to each category relating to restaurants. However, targets may be arbitrary fields. For example, targets may be accommodation facilities, in which case service IDs are sectioned for each type of accommodation facilities (such as luxury hotels and condominiums). Alternatively, targets may be leisure facilities, event sites or the like. Instead, targets may be gas stations assuming that the communication terminal 2 is used by a passenger of a traveling car. In this case, service IDs may be sectioned in accordance with the presence or absence of chargers for electric cars in gas stations, for example.

While various embodiments, configurations, and aspects of an information acquisition system, a communication terminal, an information acquisition program, a server, and an information provision program have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of apparatus detecting driving incapability state of a driver.

What is claimed is:

1. An information acquisition system comprising:
a communication terminal that includes
a camera to read an information code in which point information and a service ID are described,
a communication portion to wirelessly communicate with a server, and
an operation portion to receive an input from a user and a display; and
the server that stores point information and a service ID in association with each other,
wherein:
the information code is a two-dimensional code;
the communication terminal reads the information code, decodes the information code to acquire the point information and the service ID described in the information code, and transmits the point information and the service ID described in the information code to the server through the communication portion;
the server receives the point information and the service ID described in the information code from the communication terminal through a communication portion of the server;
the server specifies from the received point information and the received service ID, an association point information that is a particular point information, the association point information having a particular service ID which matches the received service ID described in the information code received from the communication terminal, a position corresponding to the association point information being located shorter than a predetermined distance from a position corresponding to the point information described in the information code, the predetermined distance is set through an operation to the operation portion by the user;
the server transmits the association point information to the communication terminal through the communication portion of the server; and
the communication terminal is configured to
convert the association point information received from the server into a format for displaying,
generate a first image showing the point information described in the information code and a second image showing the association point information converted into the format for the displaying, the first image and the second image having different display modes from each other, and
display both of the first image and the second image simultaneously on the display of the communication terminal, such that the second image of the association point information having identical service ID with the point information is recognized simultaneously with the first image of the point information and that the first image and the second image are discriminated by the user.

2. The information acquisition system according to claim 1 wherein:
the communication terminal outputs the point information decoded and extracted from the information code, and the association point information received from the server to an identical map screen.

3. The information acquisition system according to claim 2, wherein:
the communication terminal outputs the point information and the association point information in a distinguishable manner between the point information and the association point information.

4. A communication terminal capable of accessing a server storing point information and a service ID in association with each other, the communication terminal comprising:
an information code read portion that includes
a camera to read an information code in which the point information and the service ID are described,
a communication portion to wirelessly communicate with a server, and
an operation to receive an input from a user and a display;
a point information extraction portion that extracts the point information from the information code read by the information code read portion;
a service ID extraction portion that extracts the service ID from the information code read by the information code read portion;

a terminal-side transmission controller that causes to transmit an information request signal containing the point information extracted by the point information extraction portion and the service ID extracted by the service ID extraction portion to the server;

a terminal-side reception controller that causes to receive an information response signal containing association point information corresponding to the point information that correlates with the service ID extracted by the service ID extraction portion from the server; and an information output portion that outputs the point information extracted by the point information extraction portion, and the association point information received from the server by the terminal-side reception controller, wherein the communication terminal converts the association point information received from the server into a format for displaying, generates a first image showing the point information described in the information code and a second image showing the association point information converted into the format for the displaying, the first and second image having different display modes from each other, an displays both the first and second image simultaneously on the display of the communication terminal, such that the second image of the association point information having identical service ID with the point information is recognized simultaneously with the first image of the point information and the first image and the second image are discriminated by the user, wherein the information code is a two-dimensional code, and the communication terminal receives from the server in response to the communication terminal providing the point information and the service ID to the server, an association point information that is a particular point information, the association point information having a particular service ID which matches the provided service ID described in the information code received from the communication terminal, a position corresponding to the association point information being located shorter than a predetermined distance from a position corresponding to the point information described in the information code, the predetermined distance is set through an operation to the operation portion by the user.

5. The communication terminal according to claim 4, wherein:

the information output portion outputs the point information extracted by the point information extraction portion, and the association point information received from the server by the terminal-side reception controller to an identical map screen.

6. The communication terminal according to claim 5, wherein:

the information output portion outputs the point information and the association point information in a distinguishable manner between the point information and the association point information.

7. A non-transitory tangible computer readable storage medium storing an information acquisition program that causes a terminal-side controller of a communication terminal capable of accessing a server that stores point information and a service ID in association with each other to execute:

an information code read process, performed by the communication terminal that includes reading an information code by a camera, wirelessly communicate with a server by a communication portion, and receive an input from a user and a display by an operation portion;

a point information extraction process that extracts point information from the information code read by the information code read process;

a service ID extraction process that extracts a service ID from the information code read by the information code read process;

a terminal-side transmission control process that causes to transmit an information request signal containing the point information extracted by the point information extraction process and the service ID extracted by the service ID extraction process to the server;

a terminal-side reception control process that causes to receive an information response signal containing association point information corresponding to point information that correlates with the service ID extracted by the service ID extraction process from the server; and an information output process that outputs the point information extracted by the point information extraction process, and the association point information received from the server by the terminal-side reception control process, wherein the communication terminal converts the association point information received from the server into a format for displaying, generates a first image showing the point information described in the information code and a second image showing the association point information converted into the format for the displaying, the first and second image having different display modes from each other, an displays both the first and second image simultaneously on the display of the communication terminal, such that the second image of the association point information having identical service ID with the point information is recognized simultaneously with the first image of the point information and the first image and the second image are discriminated by the user, wherein the information code is a two-dimensional code, the communication terminal sends to the server, the point information and the service ID described in the information code from the communication terminal through a communication portion of the server, and the communication terminal receives from the server in response to the communication terminal providing the point information and the service ID to the server, an association point information that is a particular point information, the association point information having a particular service ID which matches the provided service ID described in the information code received from the communication terminal, a position corresponding to the association point information being located shorter than a predetermined distance from a position corresponding to the point information described in the information code, the predetermined distance is set through an operation to the operation portion by the user.

* * * * *